United States Patent
Koh et al.

(10) Patent No.: US 10,442,317 B2
(45) Date of Patent: Oct. 15, 2019

(54) VIRTUAL LIMIT CORRECTION DEVICE OF POWER SEAT FOR VEHICLE, AND CORRECTION METHOD THEREFOR

(71) Applicant: HYUNDAI DYMOS INCORPORATED, Seosan-si, Chungcheongnam-do (KR)

(72) Inventors: Sang Kyung Koh, Yongin-si (KR); Jong In Shin, Hwaseong-si (KR); Sang June Lee, Hwaseong-si (KR)

(73) Assignee: HYUNDAI DYMOS INCORPORATED, Seosan-Si, Chungcheongnam-Do (KR)

( * ) Notice: Subject to any disclaimer, the term of this patent is extended or adjusted under 35 U.S.C. 154(b) by 74 days.

(21) Appl. No.: 15/518,225

(22) PCT Filed: Dec. 22, 2015

(86) PCT No.: PCT/KR2015/014121
§ 371 (c)(1),
(2) Date: Apr. 10, 2017

(87) PCT Pub. No.: WO2016/108497
PCT Pub. Date: Jul. 7, 2016

(65) Prior Publication Data
US 2017/0305304 A1 Oct. 26, 2017

(30) Foreign Application Priority Data
Dec. 31, 2014 (KR) .................. 10-2014-0195359

(51) Int. Cl.
*B60N 2/02* (2006.01)
(52) U.S. Cl.
CPC ......... *B60N 2/0248* (2013.01); *B60N 2/0252* (2013.01); *B60N 2002/0236* (2013.01)

(58) Field of Classification Search
None
See application file for complete search history.

(56) References Cited

U.S. PATENT DOCUMENTS

| 4,682,088 A | * | 7/1987 | Sullivan | G05B 19/351 |
| | | | | 318/466 |
| 6,195,603 B1 | * | 2/2001 | Gauger | B60N 2/0248 |
| | | | | 296/68.1 |

(Continued)

FOREIGN PATENT DOCUMENTS

| JP | 2013256158 A | 12/2013 |
| KR | 1020040049373 A | 6/2004 |
| KR | 100981223 B1 | 9/2010 |

OTHER PUBLICATIONS

International Search Report dated Apr. 19, 2016, PCT Application No. PCT/KR2015/014121.

*Primary Examiner* — Tamara L Weber
(74) *Attorney, Agent, or Firm* — Womble Bond Dickinson (US) LLP

(57) ABSTRACT

The present invention prevents the virtual limit setting information from being initialized by expanding the position of the virtual limit to a wider range than the conventional one when the hard stop situation occurs in the before/after section of the virtual limit. For the purpose, the present invention provides a virtual limit correction device of power seat for vehicle comprising a switch for seat operation; and a seat operation control unit for correcting the virtual limit position by moving the end position of the track by using the track end position and the compensation position as compensation regions if a hard stop situation occurs in the front/rear direction based on the initially set virtual limit point during the movement of the power seat according to the switch operation.

4 Claims, 4 Drawing Sheets

(56) References Cited

U.S. PATENT DOCUMENTS

| | | |
|---|---|---|
| 6,943,516 B2 | 9/2005 | Woller et al. |
| 2011/0046855 A1* | 2/2011 | Hozumi ............... B60N 2/0232 701/49 |
| 2011/0260083 A1 | 10/2011 | Labataille et al. |
| 2014/0265991 A1* | 9/2014 | Zhao ................... B60N 2/0232 318/626 |

* cited by examiner

VIRTUAL LIMIT CORRECTION DEVICE OF POWER SEAT FOR VEHICLE, AND CORRECTION METHOD THEREFOR

TECHNICAL FIELD

The present invention relates to a power seat, and more particularly, to virtual limit correction device of power seat for vehicle, and correction method therefor wherein the position of the virtual limit is expanded and corrected to prevent the virtual limit setting information from being initialized when a hard stop situation occurs before/after section of the virtual limit.

BACKGROUND

Generally, a vehicle is provided with various kinds of convenience devices for improving the convenience of a driver or a passenger. A power seat is an example of such convenience devices. The power seat in the above description allows a specific driver to let the seat position memorized in advance in accordance with his/her body type so that the seat position can be adjusted to a previously remembered seat position by simply operating the memory replay button thereafter. Namely, the power seat has an advantage that the current seat position can be conveniently adjusted to the previously memorized seat position by pressing the memory reproduction button once without needing to newly adjust the different seat position according to the driver.

The power seat needs to detect the number of revolutions of the motor to control the position. For this, a ring magnet, a reed switch, or a Hall sensor that rotates together with the rotation axis of the motor is used. And the motor only controls the position of the power seat in the power seat control unit by counting the pulse waveform generated from the hall sensor or the reed switch.

Meanwhile, when the power seat is moved to the end of the sliding movement, the seat is pinched by the structure. When the seat is pinched, the seat movement is not normally performed even if the switch is operated.

Accordingly, a method to limit the stroke of the seat operation is applied. Namely, a Limit switch or a Stopper which mechanically performs forced restriction is used for the seat mechanism. However, since the Limit switch is relatively expensive, it causes a rise of manufacturing cost. And in the case of the stopper, there is a problem that the durability of the power seat is deteriorated due to damage to the motor and the seat mechanism when the forced restraint repeatedly occurs for a long period of time and a problem that the passenger is dissatisfied with the impact caused by the forced restraint.

Therefore, as an alternative method, controlling the region (stroke) of the seat operation by using the pulse signal of the motor has been suggested. Namely, the length of the track along which the power seat moves is detected by using the pulse signal of the motor and the motor device is stopped before the power seat reaches both ends of the track. At this time, the virtual limit section along which the power seat will practically move is determined.

FIG. 1 is a drawing illustrating the virtual limit section of the power seat.

In FIG. 1, two virtual limit points are set so that the seat does not move to both ends of the track. Accordingly, a virtual limit section (a) is provided, and the power seat slides within the virtual limit section (a). Of course, when the operation switch is inputted a predetermined number of times or more at the virtual limit point, the power seat can move to the physical limit of the track. Namely, if the operation switch is continuously operated, it moves beyond the remembered virtual limit point and moves to the actual end.

However, even if the virtual limit is set as described above, the power seat may be hard-stopped within the virtual limit section or beyond the virtual limit section. At this time, the control unit initializes the virtual limit setting information.

When the setting information for the virtual limit is initialized as described above, the control unit cannot normally operate the power seat due to the lack of information on the virtual limit. In this case, it is troublesome for the user to newly set the virtual limit.

Of course, when a hard stop occurs as described above, the control unit also corrects the virtual limit position.

The position correction corrects for a predetermined distance inward from the initially set virtual limit point as shown in FIG. 2. At this time, the correction point is located inside the virtual limit point.

However, when the position correction is performed in such a manner, there can be a problem that the operation section of the power seat becomes shorter and shorter.

SUMMARY OF INVENTION

Solution to Problem

Therefore, the present invention is directed to providing a device for correcting a virtual limit of a power seat for vehicle and a correction method thereof, which can compensate the compensation position by expanding a compensation position when correcting a position of a virtual limit.

The present invention is also directed to providing a device for correcting a virtual limit of vehicle power seat and a correction method thereof, in which virtual limit information is prevented from being initialized due to a hard stop situation in a state where virtual limit information is set.

Technical Solution

According to an aspect of the present invention for achieving the above object, the present invention provides a virtual limit correction device of power seat for vehicle comprising a switch for seat operation; and a seat operation control unit for correcting the virtual limit position by moving the end position of the track by using the track end position and the compensation position as compensation regions if a hard stop situation occurs in the front/rear direction based on the initially set virtual limit point during the movement of the power seat according to the switch operation.

When the hard stop occurrence position is within the virtual limit operation section, the position information of the track end is moved to the initially set virtual limit position to be corrected.

If the hard stop occurrence position is other than the virtual limit operation section, the position information of the track end is moved to the position where the hard stop occurs to correct the position.

The virtual limit position moves together with the position information of the track end.

According to another aspect of the present invention, the present invention provides a correcting method of virtual limit of power seat for vehicle comprising detecting hard stop occurrence during the power seat movement; and correcting virtual limit by moving the end position of the track by using the regions between the track end position and the compensation position as compensation regions.

The method further comprises storing the setting information on the corrected virtual limit.

If the hard stop is within the virtual limit operation section, the end position of the track is moved to the initially set virtual limit position to be corrected, and if the hard stop is other than the virtual limit operation section, the end position of the track is shifted to the position where the hard stop occurs to be corrected.

Effects of Invention

The effects of the virtual limit correction device of power seat for vehicle, and correction method therefor according to the present invention are described below.

That is, according to the present invention, when a hard stop occurs in a front/rear area based on the initially set virtual limit point set during a power seat operation, a hard stop position at the end of a physical track is moved, corrected, and saved.

Therefore, the present invention can prevent the virtual limit setting information from being initialized due to occurrence of a hard stop in the power seat, thereby solving the problem that the power seat cannot be normally operated.

Also, the present invention can prevent the operation section of the power seat by moving/correcting the occurrence position of hard stop.

METHOD FOR CARRYING OUT THE INVENTION

The present invention prevents the virtual limit setting information from being initialized by expanding the position of the virtual limit to a wider range than the conventional one when the hard stop situation occurs in the before/after section of the virtual limit set for sliding movement of the power seat for vehicle. A hard stop typically means a mechanical device that limits the travel of a mechanism. But in this specification, a hard stop means a complete stop of a power seat operation.

Figure 3:
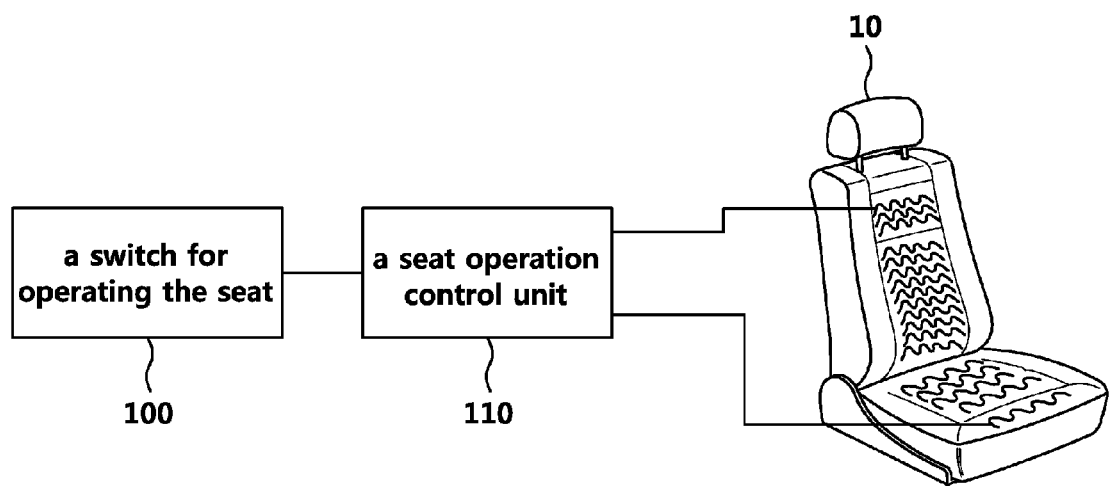
FIG. 3 illustrates virtual limit correction device of power seat for vehicle according to an exemplary embodiment of the present invention.

Hereinafter, an exemplary embodiment of a virtual limit correction device of power seat for vehicle, and correction method therefor according to the present invention will be described more fully with reference to accompanying drawings. Virtual limit correction device of power seat FIG. 3 illustrates virtual limit correction device of power seat for vehicle according to an exemplary embodiment of the present invention.

The present invention uses the pulse signal of the motor instead of a mechanical switch such as a limit switch to sense the full length of the track and set the virtual limit position so that the power seat 10 is not moved to the end of the track. Therefore, the present invention comprises a seat operation switch 100 and a seat operation control unit 110 which controls the movement of the power seat 10 according to the operation of the seat operation switch 100. And a memory (not illustrated) storing various information related to the operation of the power seat 10 such as virtual limit setting information is constructed.

Herein, the seat operation control unit 110 controls the process of setting the position of virtual limit through the memory initialization process. That is, the power seat 10 is moved to the end of the track in one direction in memory initialization state, and then is held for a predetermined time, and likewise it is moved to the end of the track in the opposite direction, and then is held for a predetermined time. Then, the setting of the virtual limit section is complete, and the seat is moved within the virtual limit section henceforth.

Also, the seat operation control unit 110, performs the function of correcting the position of virtual limit when a hard stop situation occurs in the front/rear direction of the virtual limit point. The position correction of the virtual limit can be classified into a case in which the hard stop situation occurs within the virtual limit section or outside the virtual limit section, respectively, based on the set virtual limit point. This will be explained below.

Figure 4:
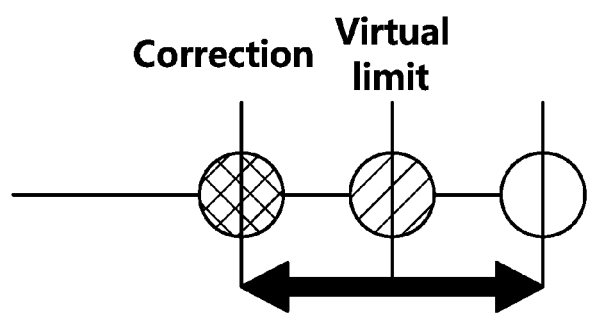
FIG. 4 illustrates the range of position correction of virtual limit according to an exemplary embodiment of the present invention.

FIG. 4 illustrates the range of position correction of virtual limit according to an exemplary embodiment of the present invention.

Figure 1:
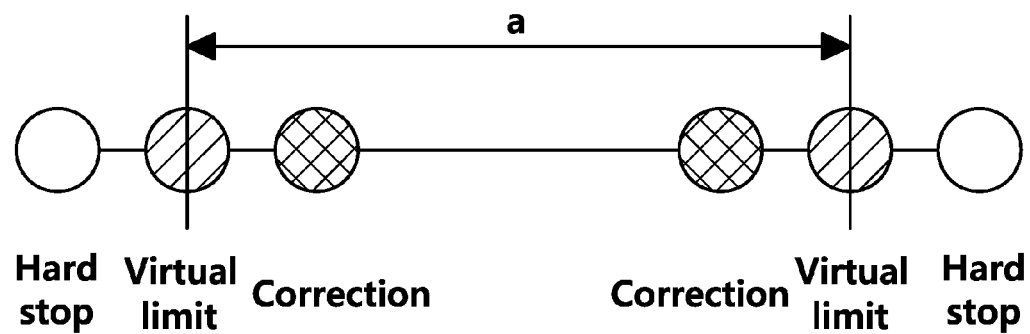
FIG. 1 is a drawing illustrating the virtual limit section of the power seat.
Figure 2:
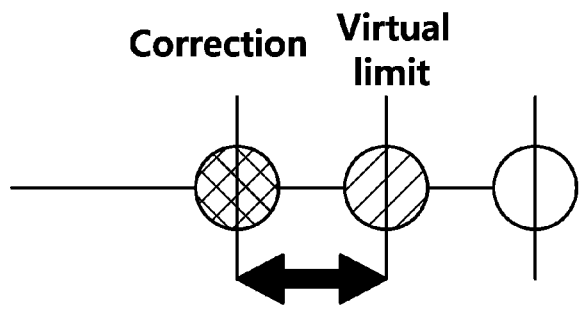
FIG. 2 explains the range of position correction of virtual limit in FIG. 1.

Comparing FIG. 4 and FIG. 2, it can be seen that the compensation range of the virtual limit according to the present invention is extended from the track end to the compensation point. For instance, the compensation region can be defined between the inner compensation point and the physical end of the track based on the virtual limit point. The virtual limit can be corrected without releasing the setting information of the virtual limit while maintaining the operating section of the power seat 10 through the expansion of the compensation region.

Figure 5:
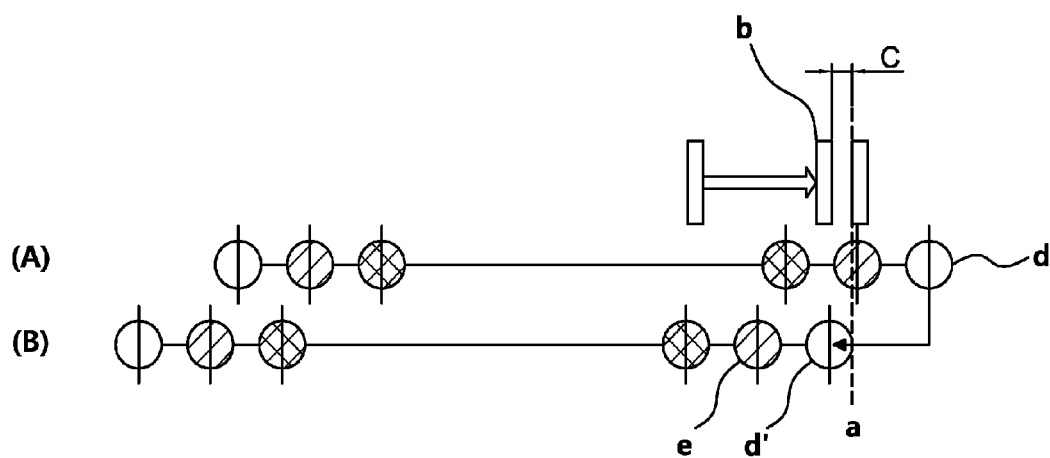
FIG. 5 and FIG. 6 are drawings illustrating examples of correcting the position of virtual limit according to the occurrence position of hard stop according to an exemplary embodiment of the present invention.
Figure 6:
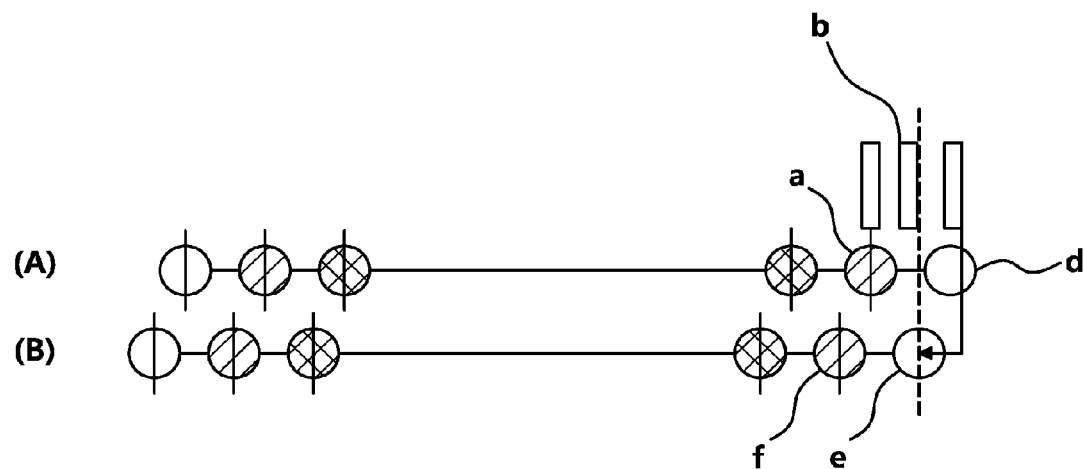

The position correction of the virtual limit will be explained through FIG. 5 and FIG. 6. FIG. 5 and FIG. 6 are drawings illustrating examples of correcting the position of virtual limit according to the occurrence position of hard stop according to an exemplary embodiment of the present invention.

FIG. 5 shows a case where a hard stop situation occurs in a section of the virtual limit. In FIG. 5, (A) is set information by the seat operation control unit 110, (B) is information after correction.

When the virtual limit position is set to point a as shown in FIG. 5A, if the hard stop occurs at point b during the sliding movement of the power seat 10, the seat operation control unit 110 conventionally initializes the virtual limit setting information. Also, an inoperable section c of the power seat 10 exists between the virtual limit position a and the section b where the hard stop occurs. The operating section of the power seat 10 is shortened due to the inoperable section.

However, in an exemplary embodiment of the present invention, the position information d of the track end is moved to a predetermined virtual limit position d and corrected. In this case, the virtual limit position e is moved together as well as the position information of the track end d.

FIG. 6 illustrates a case when a hard stop situation occurs at a point outside the virtual limit. (A) is set information by the seat operation control unit, and (B) is information after correction.

It shows a case where the hard stop occurs at point b during the sliding movement of the power seat 10 in a state where the virtual limit position is set to point a as shown in (A). Namely, a hard stop position exists between the predetermined virtual limit position a and the end position d of the track. In this case, too, the seat operation control unit 110 conventionally initialized the virtual limit setting information. Therefore, there was a problem the power seat 10 cannot be driven by the memory function.

However, according to an exemplary embodiment of the present invention, as shown in (B), the position information of the track end d is moved to the position e at which the hard stop occurs to correct it. Of course, in this case, the virtual limit position f also moves together.

As illustrated in FIG. 5 and FIG. 6, when the hard stop situation occurs, the position information d of the track end is moved to the virtual limit position and the hard stop occurrence position, thereby making it possible to solve the problem that the actual operation section of the power seat 10 is shortened. Furthermore, since the position information of the virtual limit (e of FIG. 5 and f of FIG. 6) together with the corrected end position information d is saved in the memory, it is prevented that the setting information of the virtual limit is released and the power seat 10 cannot be driven as in the prior art.

Figure 7:
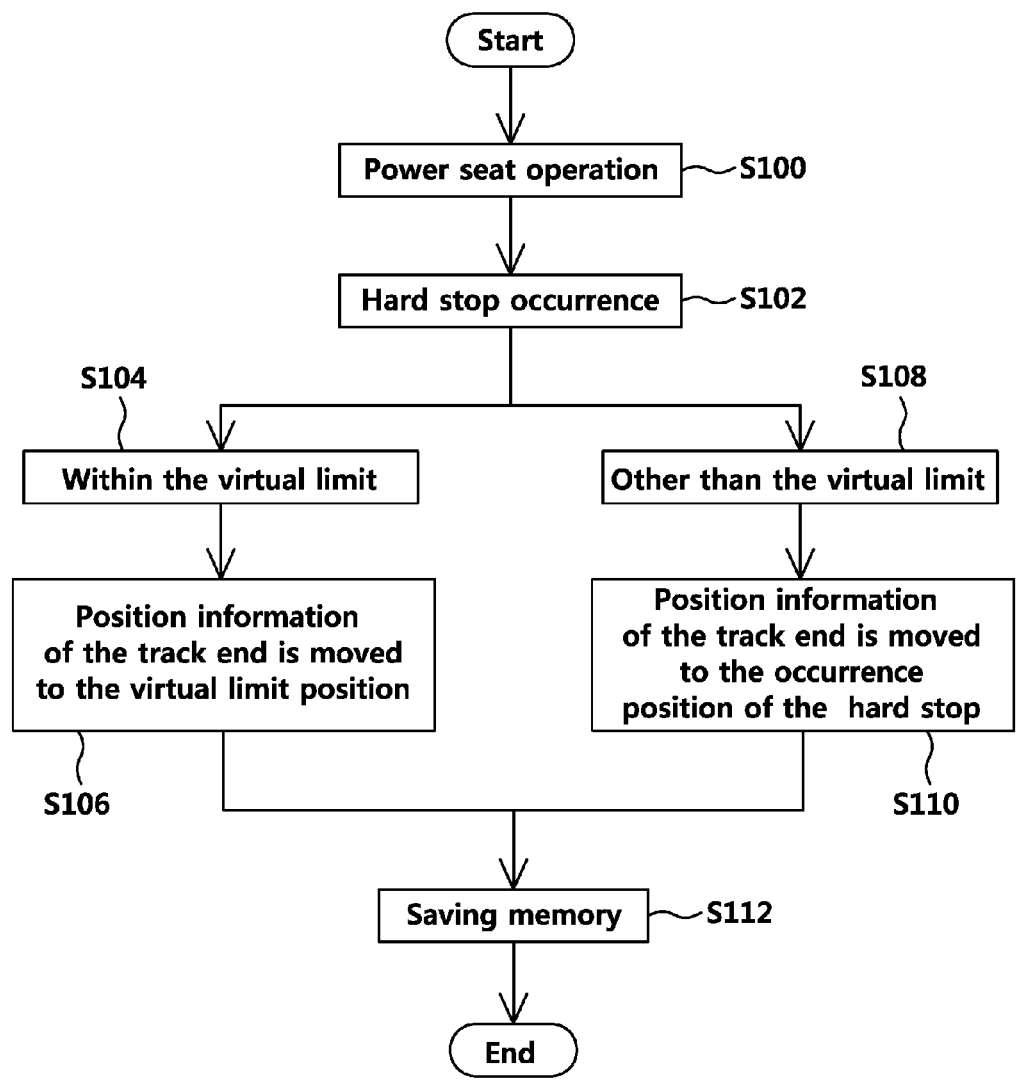
FIG. 7 is a flow chart explaining the method of correcting virtual limit of power seat for vehicle according to the present invention.

FIG. 7 is a flow chart explaining the method of correcting virtual limit of power seat for vehicle according to the present invention.

When the virtual limit setting information is set, the power seat slides according to the operation of the seat operation switch (s100).

Then, a hard stop situation occurs (s102). And then, the seat operation control unit 110 applies the position correction logic of the virtual limit differently according to the hard stop occurrence position.

Namely, as explained in FIG. 5, if a hard stop occurs within the virtual limit section (s104), the seat operation control unit 110 moves the position information of the track end to the virtual limit position held by the seat operation control unit and corrects it (s106). Meanwhile, as illustrated in FIG. 6, if a hard stop occurs out of the virtual limit section (s108), the seat operation control unit 110 moves the position information of the track end to the position where the hard stop occurs and corrects it (s110). At this time, the virtual limit position is changed along with the position of the corrected track end.

The changed position of the virtual limit is saved in the memory (s112). Therefore, even if a hard stop occurs, the power seat 10 can be normally driven because the virtual limit setting information is not released and remains at the corrected value.

As described above, the present exemplary embodiment provides a virtual limit correction method in a section in which the vehicle power seat is operated. This is configured to prevent the operating section from being shortened due to occurrence of hard stop during the power seat operation and to prevent the setting information of the virtual limit from being released.

While this invention has been described in terms of its characterization, structure, and effects in connection with what is presently considered to be practical exemplary embodiments, it is to be understood that the invention is not limited to the disclosed embodiments. Furthermore, the described characterization, structure, and effects of the embodiments may be modified in various different ways by those skilled in the art. And these differences related to modifications and applications are intended to be included within the scope of the present disclosure as defined in what is claimed.

INDUSTRIAL APPLICABILITY

In the present invention, when a hard stop occurs in a front/rear area based on a first virtual limit point set during a power seat operation, the hard stop position of a physical track end is moved and corrected. Therefore, the virtual limit setting information can be prevented from being initialized due to the occurrence of the hard stop in the power seat, thereby solving the problem that the power seat cannot be normally driven. Also, by moving/correcting the position of the hard stop occurrence, the operation section of the power seat can be prevented from being shortened.

What is claimed is:

1. A virtual limit correction device of a power seat comprising:
   a switch for driving the seat; and
   a controller for extending a virtual limit position by moving an end position of a track by using the track end position and a compensation position as compensation regions if a hard stop situation occurs in a front/rear direction based on an initially set virtual limit point during movement of the power seat according to the switch operation,
   wherein when a hard stop occurrence position is within a virtual limit section, a position information of the track end is moved to an initially set virtual limit position to be corrected, and
   when the hard stop occurrence position is outside the virtual limit section, the position information of the track end is moved to a position where the hard stop occurs to correct the position information of the track end.

2. The virtual limit correction device of claim 1, wherein the virtual limit position moves together with the position information of the track end.

3. A correction method of a virtual limit of a power seat for a vehicle comprising:
   detecting hard stop occurrence during a power seat movement; and
   extending the virtual limit by moving an end position of a track by using regions between a track end position and a compensation position as compensation regions,
   if the hard stop is within a virtual limit operation section, the end position of the track is moved to an initially set virtual limit position to be corrected, and if the hard stop is outside the virtual limit operation section, the end position of the track is shifted to a position where the hard stop occurs to correct the end position.

4. The correction method of claim 3, further comprising:
   saving a setting information on the corrected virtual limit position.

* * * * *